Oct. 9, 1928.
E. E. WAGNER
1,687,407
AUTOMOBILE SKID CHAIN
Filed Nov. 22, 1927
Fig. 1.
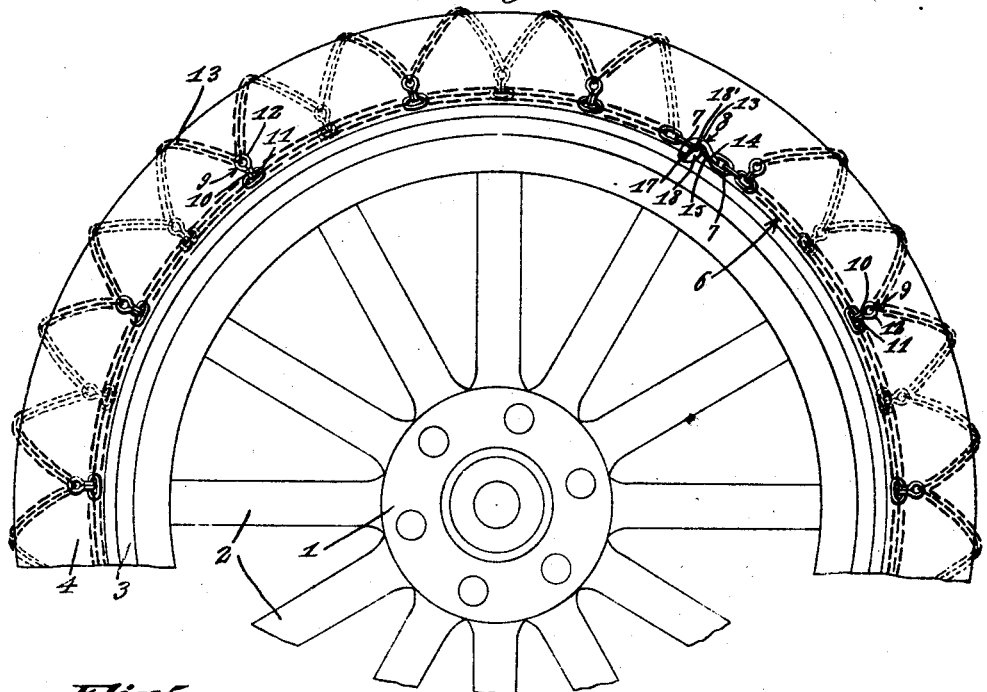
Fig. 5.
Fig. 2.
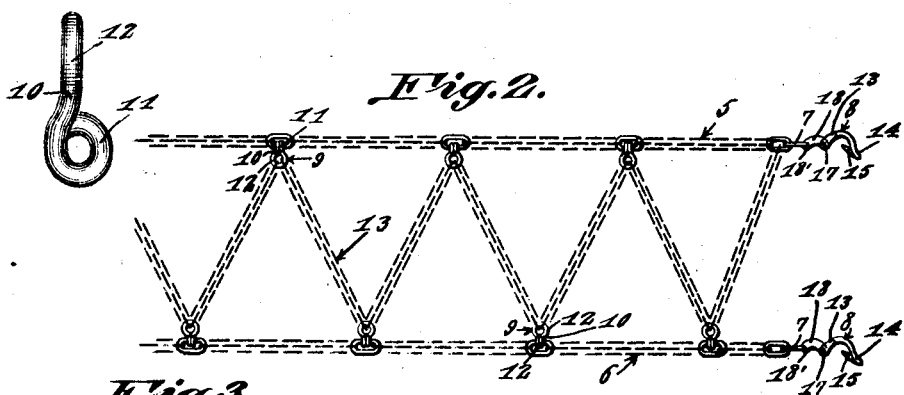
Fig. 3.
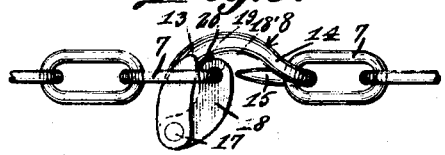
Fig. 4.
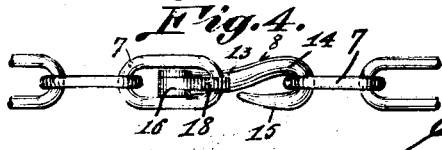
E. E. Wagner, INVENTOR.
BY
Geo. P. Kimmel, ATTORNEY.

Patented Oct. 9, 1928.

1,687,407

UNITED STATES PATENT OFFICE.

ELI E. WAGNER, OF LEWISTOWN, PENNSYLVANIA.

AUTOMOBILE SKID CHAIN.

Application filed November 22, 1927. Serial No. 235,000.

This invention relates to an anti-skidding or anti-slipping attachment, of the chain type, for tires of vehicle wheels, and is designed primarily for use upon pneumatic or cushion tires, but it is to be understood that an anti-slipping or an anti-skidding attachment in accordance with this invention can be used for any purposes for which it is found applicable, and the invention has for its object to provide, in a manner as hereinafter set forth, an attachment of the class referred to for mounting circumferentially with respect to the tire, and act as a tread surface therefor to prevent slipping or skidding during the travel of the wheel over a slippery or moist road surface and further whereby the attachment will set up a gripping action on the side of a tire when leading out of an ice, snow or mud gutter.
A further object of the invention, is to provide, in a manner as hereinafter set forth, an attachment of the class referred to including means to prevent the attachment from shifting circumferentially with respect to a tire when the attachment is mounted on the latter to prevent slipping or skidding.

Further objects of the invention are to provide, in a manner as hereinafter set forth, an attachment of the class referred to, which is simple in construction and arrangement, strong, durable, having the anti-slipping or anti-skidding devices disposed in a zig-zag manner with respect to the tire, reducing the tangling of the attachment to a minimum when off the tire, conveniently attached in position to the tire, thoroughly efficient in its use and inexpensive to manufacture.

With the foregoing and other objects in view the invention consists of the novel construction, combination and arrangement of parts, as hereinafter more specifically described and illustrated in the accompanying drawings, wherein is shown an embodiment of the invention, but it is to be understood that changes, variations and modifications can be resorted to which fall within the scope of the claims hereunto appended.

In the drawing wherein like reference characters denote corresponding parts throughout the several views:—

Figure 1 is a fragmentary view, in side elevation, of a wheel showing the adaptation with the tire thereof of an anti-slipping or anti-skidding attachment in accordance with this invention.
Figure 2 is a fragmentary view, in plan, of an anti-slipping or anti-skidding attachment in accordance with this invention.

Figure 3 is a fragmentary view, in plan, illustrating the means for connecting the attachment to the tire of the wheel.

Figure 4 is a view similar to Figure 3, in side elevation.

Figure 5 is a side elevation of a coupling member employed for the anti-slipping or anti-skidding elements.

Referring to the drawing in detail 1 denotes the hub, 2 the spokes, 3 the rim and 4 the tire of a wheel. The tire 4 is of the pneumatic type.
An anti-slipping or anti-skidding attachment for wheel tires, in accordance with this invention is of the chain type and includes a pair of side members 5, 6, each of a length to extend substantially around the side of the tire and to be connected together by a short coupling device. The chain which forms the side member 5, as well as the chain which provides the side member 6, preferably is constructed from oval-shaped links 7 interengaging with each other. The end links of each chain are connected together by a coupling device 8 to be hereinafter more fully referred to.

Carried by each of the side members is a series of spaced coupling members referred to generally by the reference character 9. The coupling members 9 carried by the side member 5 are equally spaced with respect to each other and the same arrangement applies to the coupling members 9 carried by the side member 6. The coupling members 9 carried by the side member 5 are alternately disposed with respect to the coupling members 9 carried by the side member 6. Each coupling member 9 consists of a shank 10 terminating at its outer end in a hook 11 which engages with a link of a side member for connecting the coupling member 9 therewith. The outer end of the shank 10 terminates in an eye 12 and is inset to oppose the link to which the hook 11 is attached. The hook 11 embraces the link to which it is attached and extends in close proximity to the shank.

The series of coupling members carried by the side member 5, as well as the series of coupling members carried by the side member 6, connect anti-slipping or anti-skidding elements to the said side members 5 and 6. The anti-skidding members are of the chain type and are referred to generally by the reference character 13. Each coupling member 9 connects a pair of anti-skidding elements 13 with that chain to which the coupling member is secured by its hook 11. The ends of the anti-skidding elements 13 have a loose connection with the coupling members and the ends of a pair of anti-skidding elements which are connected to a coupling member 9 do not overlap but are arranged in side-wise relation. The anti-skidding elements 13 are disposed in a zig-zag manner throughout the tire when the attachment is secured therewith. The anti-skidding elements are alternately arranged to extend forwardly and rearwardly at an inclination and which provides for the zig-zag arrangement referred to.

The coupling member or device 8 employed for connecting the two end links of a side member together comprises a hook consisting of a shank formed of a pair of oppositely disposed arcuate portions 13, 14 and with the latter extending upon a greater arc and of less length than the length of the former. The portion 13 is angularly disposed with respect to the portion 14 and it may be termed as being of substantially inverted L-shape. The portion 13 extends through one of the end links and the portion 14 through the other end link of the side member. The portion 13 further projects in directions substantially at right angles when the coupling device is in coupling position. The portion 13 merges into the portion 14 and the latter terminates in a bill 15 which is offset laterally with respect to said portion 14 and projects in a direction from one end link toward the other end link. The bill 15 is disposed in a plane forming a continuation of the plane of the longitudinal median of the pair of opposed end links. The free terminal part of the portion 13 of the shank is bifurcated, as at 16 and pivotally connected, as at 17, to the bifurcated terminal of the shank is a curved link 18 which is pivotally connected to that end link through which the portion 13 extends. One end of the link 18 is pivotally connected to the shank and the other end pivotally connected to the end link, as at 18′.

When the coupling device 8, is in active position, the shank of the hook element, intermediate its ends, abuts against the end of the link 18 which is pivoted to the end link of the side member. The shank abuts against the link 18 exteriorly of the end link, at the inner side of the end edge of the link 18, as indicated at 19. The part of abutment of the shank with the link 18 is indicated at 20. The abutting position between the shank and link 18 is maintained while the side members are taut and such abutting engagement retains the side members on the tire. The abutting of the shank on the link 18 prevents the latter from swinging outwardly while the side member is connected in position, and under such conditions the portion 13 of the shank is held extending through the end link of the side member, as the link 18 is connected to the shank as at 16. The greater the pull on the bill of the hook element by one of the end links of the side member, the tighter the clamping action between the shank and the link 18. The clamping device is shifted to active position and from the latter to inactive position by a suitable tool. When the coupling device is shifted to inactive position the portion 13 of the shank of the hook element passes outwardly through the end link of the chain, and the link 18 moves toward such end link whereby the shank is shifted sufficiently to enable the bill of the hook element to be disconnected from the side member.

An anti-skidding or anti-slipping attachment, in accordance with this invention, not only grips at the tread portion of the tire but also on the side thereof, and during the travel of the wheel skidding or slipping is reduced to a minimum, therefore it is thought that the many advantages of an attachment in accordance with this invention can be readily understood, and although the preferred embodiment of the invention is as illustrated and described, yet it is to be understood that changes in the details of construction can be had which fall within the scope of the invention as claimed.

What I claim is:—

1. A coupling device for the ends of a side chain of an anti-skidding attachment comprising a hook element formed of a shank terminating at one end in a laterally disposed bill to engage one of the end links of the side chain, said shank including an angularly disposed curved portion for extension through the other end link of the chain, and a shiftable curved member pivoted at its outer end to the outer end of said curved portion and further adapted to have its inner end pivotally connected to the last mentioned end link of the chain, the curved portion of said shank positioned against and shiftable on the inner end edge of said member whereby when the latter is swung outwardly the end links of the side chain are pulled together and secured in position with respect to the tire when the bill is in engagement with one of said end links.

2. A coupling device for the ends of a side chain of an anti-skidding attachment comprising a hook element formed of a shank terminating at one end in a laterally disposed bill to engage one of the end links of the side chain, said shank including an angularly disposed curved portion for extension through the other end link of the chain, and a shiftable curved member pivoted at its outer end to the outer end of said curved portion and further adapted to have its inner end pivotally connected to the last mentioned end link of the chain, the curved portion of said shank positioned against and shiftable on the inner end edge of said member whereby when the latter is swung outwardly the end links of the side chain are pulled together and secured in position with respect to the tire when the bill is in engagement with one of said end links, said member being oppositely curved with respect to the curved portion of said shank.

In testimony whereof, I affix my signature hereto.

ELI E. WAGNER.